United States Patent [19]

Utagawa

[11] Patent Number: 4,674,855
[45] Date of Patent: Jun. 23, 1987

[54] SIGNAL PROCESSING APPARATUS FOR PHOTOELECTRIC CONVERTING ELEMENT ARRAY

[75] Inventor: Ken Utagawa, Kawasaki, Japan
[73] Assignee: Nippon Kogaku K. K., Tokyo, Japan
[21] Appl. No.: 725,221
[22] Filed: Apr. 19, 1985
[30] Foreign Application Priority Data
Apr. 24, 1984 [JP] Japan ................. 59-82456
[51] Int. Cl.⁴ .................................... G03B 3/00
[52] U.S. Cl. ..................................... 354/403
[58] Field of Search ........................... 354/403
[56] References Cited
U.S. PATENT DOCUMENTS

| | | | |
|---|---|---|---|
| 4,218,623 | 8/1980 | Utagawa | 250/578 |
| 4,251,144 | 2/1981 | Matsuda et al. | 354/403 |
| 4,288,152 | 9/1981 | Matsuda | 354/403 |
| 4,298,258 | 11/1981 | Matsuda et al. | 354/403 |
| 4,322,141 | 3/1982 | Tominaga et al. | 354/403 |
| 4,336,450 | 6/1982 | Utagawa et al. | 250/201 |
| 4,367,934 | 1/1983 | Matsui | 354/403 |
| 4,534,636 | 8/1985 | Sugawara | 354/403 |

*Primary Examiner*—Russell E. Adams
*Attorney, Agent, or Firm*—Shapiro and Shapiro

[57] ABSTRACT

A signal processing apparatus for a photoelectric converting element array capable of providing a high resolving power is equipped with an array composed of plural light-receiving elements, in which plural pairs of light-receiving elements are formed wherein a determined number of light-receiving elements are placed between the light-receiving elements constituting each pair and there is determined the difference of outputs of the light-receiving elements constituting each pair.

18 Claims, 18 Drawing Figures

SIGNAL PROCESSING APPARATUS FOR PHOTOELECTRIC CONVERTING ELEMENT ARRAY

BACKGROUND OF THE INVENTION

1. Field of the Invention

The present invention relates to a signal processing apparatus for photoelectric converting element array for use in a range finder or the like.

2. Description of the Prior Art

A signal processing apparatus for a photoelectric converting element array is employed for example in a range finder of a camera. Such range finder is already known for example in the U.S. Pat. No. 4,288,152, in which is disclosed a system of projecting a light beam from projecting means to an object and detecting which of four light-receiving elements receives the reflected light. The processing method disclosed therein is to identify whether the reflected light is received most strongly by any one of four light-receiving elements or substantially equally by two or three neighboring light-receiving elements.

However such detecting method only provides a resolving power approximately equal to a half of the width of the light-receiving elements, so that the use of four light-receiving elements allows resolving only eight range zones or so.

SUMMARY OF THE INVENTION

An object of the present invention is to provide a signal processing apparatus for a photoelectric converting element array capable of providing a high resolving power.

Another object of the present invention is to provide a signal processing apparatus for a photoelectric converting element array, capable of improving the resolving power of said array employing a limited number of photoelectric converting elements and therefore of being easily incorporated in a range finder for example for use in a photographic camera.

The foregoing objects can be achieved according to the present invention by an apparatus equipped with an array composed of plural light-receiving elements, in which plural pairs of light-receiving elements are formed wherein a determined number of light-receiving elements are placed between the light-receiving elements constituting each pair and there is determined the difference of outputs of the light-receiving elements constituting each pair.

DETAILED DESCRIPTION OF THE PREFERRED EMBODIMENTS

Figure 1:
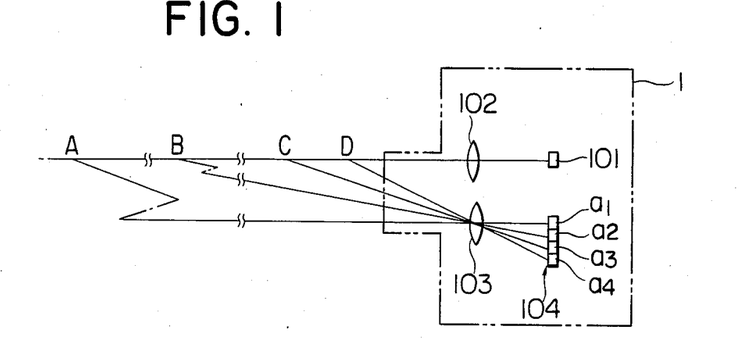
FIG. 1 is a schematic view showing the principle of a finding method according to the present invention.

FIG. 1 shows the principle of triangular range finding, wherein a camera body is represented by double-dotted chain lines. Light emitted from a light-emitting element 101 incorporated in the camera body 1 is converted by a lens 102 into a substantially parallel light beam and projected to an object. According to whether the object is positioned at A, B, C or D, the light reflected therefrom falls on the different positions on a light-receiving surface of an array 104, namely on photoelectric converting elements a1, a2, a3 and a4, positioned behind a receiving lens 103, and the distance to the object can be determined by detecting the incidence position of said reflected light.

Figure 2:
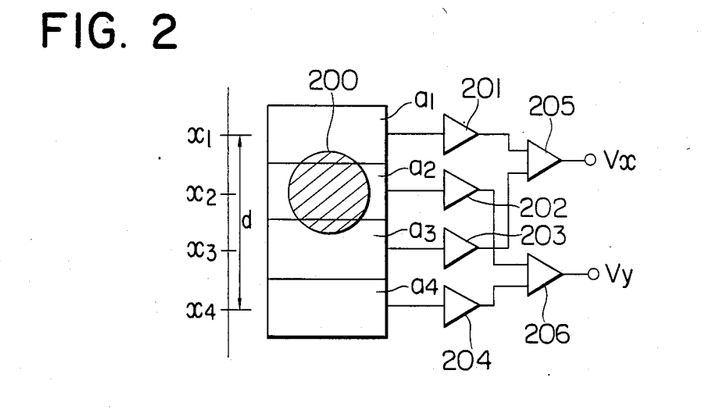
FIG. 2 is a schematic view showing the principle of the present invention.
Figure 3:
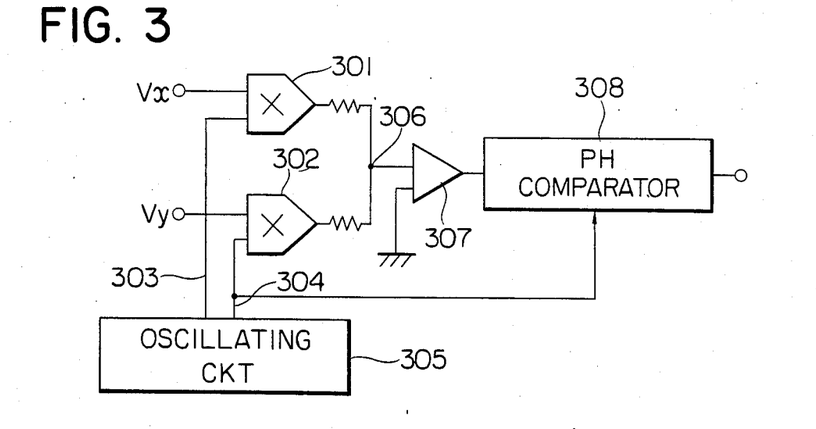
FIG. 3 is a block diagram showing a first embodiment of the present invention.

Now reference is made to FIGS. 2 and 3 for explaining a first emboidment of the present invention. In FIG. 2, photoelectrically converted output signals from light-receiving elements a1, a2, a3 and a4 are processed in signal detecting units 201, 202, 203, 204, and differential amplifiers 205, 206 determine differences Vx,Vy of the outputs in two paired light-receiving elements, each pair having a light-receiving element therebetween. The difference Vx is determined by multiplying the output of the photoreceptor a1 by a determined vector, multiplying the output of the light-receiving element a3 by another vector displaced by 180° from the first-mentioned vector, and adding two products. The difference Vy is determined in a similar manner. This principle is already known in the U.S. Pat. No. 4,218, 623, but the present invention is different from such prior technology in that said difference of the outputs of two light-receiving elements can be obtained without complex circuitry. In range finding in the presence of bright background lighting, the projected light is usually modulated in amplitude, and the aforementioned signal detecting units 201, 202, 203, 204 have a function of amplifying the modulated light more strongly than the background light constituting a DC component and are equipped with synchronous rectifying units for multiplying the input signal by the synchronization signal of the light-emitting element 101 and then smoothing the signal, in order to extract the modulated component alone.

FIG. 3 shows a device for accurately calculating the position of a light spot 200 by means of the differential outputs Vx, Vy of two pairs of light-receiving elements taken in every other position. The method herein is similar to the method of phase formation and comparison of two light-receiving arrays disclosed in the U.S. Pat. No. 4,336,450 of the applicant, but the embodiment shown in FIG. 3 merely serves for detecting the position of the light spot 200 on the array. In FIG. 3, each of modulators 301, 302 receive the differential output Vx or Vy at a terminal and an oscillating signal sinωt or cosωt at the other terminal, from an oscillator 305 through a signal line 303 or 304. Thus the modulators 301, 302 respectively produce output signals representing Vx·sinωt and Vy·cosωt, and a synthesized output signal Vx·sinωt+Vy·cosωt is obtained at 306. A comparator 307 converts said synthesized output signal into a square wave, and a phase comparator 308 compares the phase of said square wave signal with that of an output signal of the oscillator 305. A phase advancement of 90° corresponds to a displacement of the light spot by the width of a light-receiving element. The calculation of the distance to the object from the result of phase comparison by a phase comparator as explained above is already known from the U.S. Pat. No. 4,336,450 and will not therefore be explained in detail.

A suitable selection of the shape of said light spot allows establishing a very accurate proportional relationship between the displacement of said light spot and said phase change, and it becomes possible to form 10 divisions or more within the width of a light-receiving element. A light spot enabling such relationship has an intensity distribution along the array of the light-receiving elements that is close to a function defined by a convolution of a square function of a width p and a square function of a width 1.33p, namely an isosceles trapezoid with a top of 0.33p and a bottom of 2.33p, wherein p is the pitch of light-receiving elements.

Figure 4:
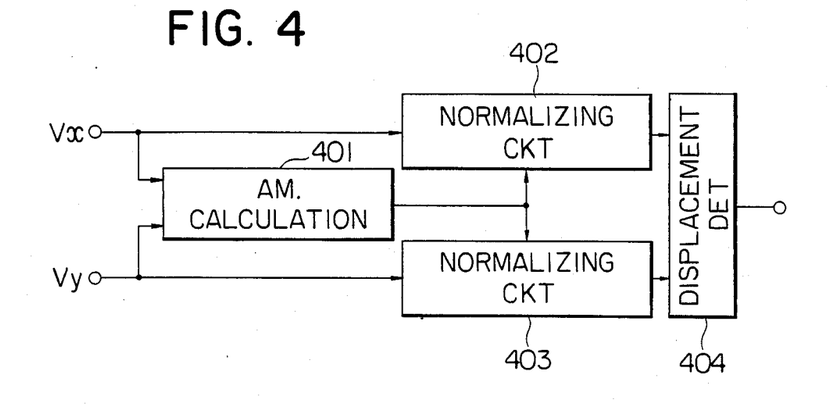
FIG. 4 is a block diagram showing a second embodiment of the present invention.

FIG. 4 shows a second embodiment representing another circuit for detecting the positional displacement, said circuit being adapted to receive the output signals Vx, Vy of the circuit shown in FIG. 2. An amplitude calculating circuit 401 calculates an amount $V0=|Vx|+|Vy|$, and normalizing circuits 402, 403 respectively calculate $\bar{V}x=Vx/V0$ and $\bar{V}y=Vy/V0$.

Figure 5:
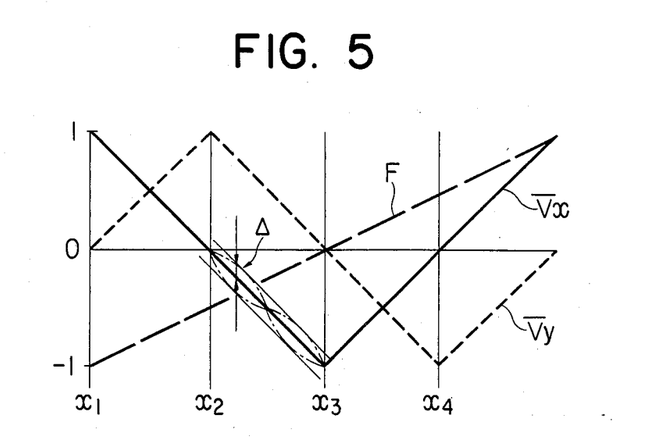
FIG. 5 is a chart showing the change in signal in response to the displacement of the light spot.

The values $\bar{V}x$, $\bar{V}y$ thus determined vary as shown in FIG. 5 with the displacement of the center of gravity of said light spot from x1 to x4 shown in FIG. 2.

A displacement detecting circuit 404 performs the following calculations:

$$F=(\bar{V}x+1)/2; (\bar{V}y<0 \text{ or } Vy<0)$$

$$F=(-\bar{V}x-1)/2; (\bar{V}y\geq 0 \text{ or } Vy\geq 0) \quad (1)$$

The value F thus determined is a linearly varying function, represented by a broken line F in FIG. 5, in relation to the displacement of the light spot. In this process, an optimum linearity is obtained for example with a square intensity distribution of the light spot, having a width equal to the pitch p of the light-receiving elements.

Figure 6:
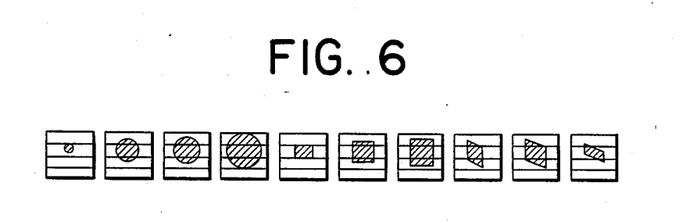
FIG. 6 is a view showing various forms of the light spot.

However, the error in the linearity is in the order of Δ shown in FIG. 5, or as small as $\Delta \leq 0.1 p$, even when the intensity distribution of the light spot varies from one light-receiving element to three light-receiving elements as shown in FIG. 6. Also in the calculation of F, the calculation of $\bar{V}y$ with the block 403 is not essential.

As explained in the foregoing, the present invention allows achieving a resolving power finer than 1/10 of the width of a light-receiving element in case the light spot has a specially defined intensity distribution, and a resolving power finer than ¼ of the width of a light-receiving element even when the light spot has an arbitrary intensity distribution.

Figure 7A:
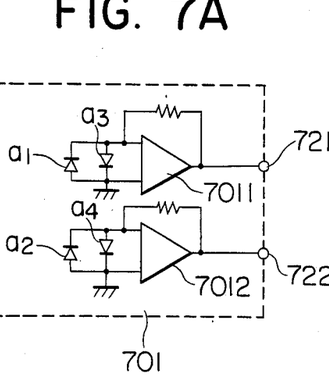
FIGS. 7A, 7B and 7C are block diagrams showing a third embodiment of the present invention.
Figure 7B:
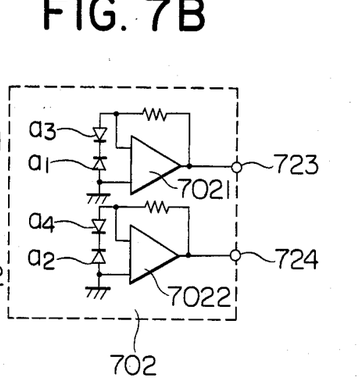
Figure 7C:
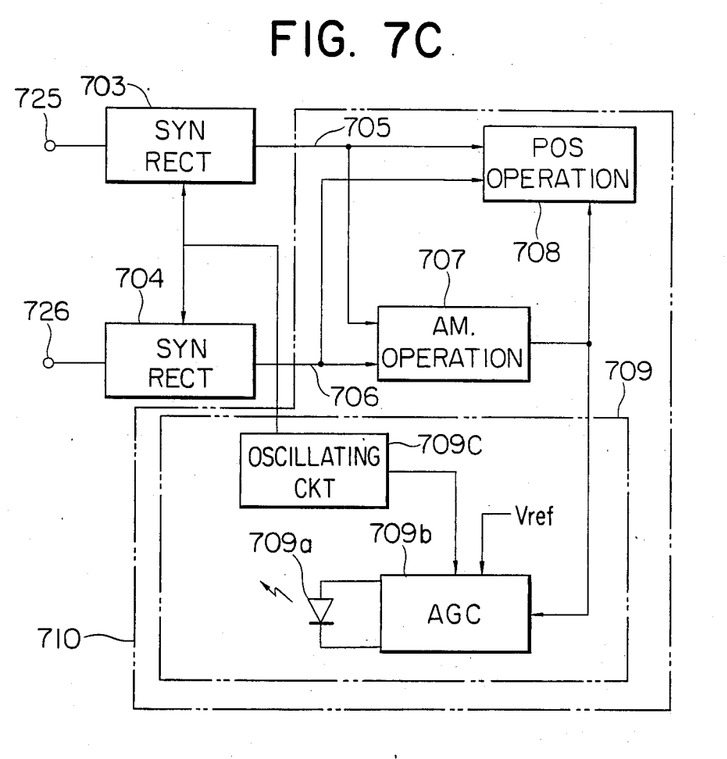

FIGS. 7A, 7B and 7C show a third embodiment of the present invention, which is featured by a significantly simplified input stage in comparison with the embodiment shown in FIG. 2. Paired light-receiving elements a1, a3 or a2, a4 are connected inversely, either in parallel manner as shown in a block 701 in FIG. 7A or in serial manner as shown in a block 702 in FIG. 7B. Consequently the difference of incident light to the photodiodes a1, a3 or a2, a4 is automatically calculated, so that there are required only two buffer amplifiers 7011, 7012 or 7021, 7022. Besides the effect of background lighting falling on the photodiodes a1–a4 with substantially the same intensity is cancelled. This fact simplifies the structure of the buffer amplifiers since they no longer need the DC-eliminating filter effect which is indispensable in case the output of each photoelectric converting element is independently amplified as in the embodiment shown in FIG. 2.

The two differential outputs thus obtained from output terminals 721, 722 or 723, 724 are supplied to input terminals 725, 726 shown in FIG. 7C. The output signals are compared, in synchronous rectifiers 703, 704, with a signal from an oscillating circuit 709c, utilized for modulating the light emission in a light-emitting unit 709 composed of a light-emitting diode 709a an automatic gain controlling circuit (AGC) 709b and said oscillating circuit 709c, thus extracting the modulated components and generating the signal components Vx, Vy at output lines 705, 706. The determination of the positional displacement of the light spot from said signals Vx, Vy may be achieved by the circuit shown in FIG. 3 or 4, but there will be explained still another circuit.

In FIG. 7C, a block 710 represents this circuit, wherein the output signals Vx, Vy are supplied to an amplitude operating circuit 707 to calculate the amplitude $V0=|Vx|+|Vy|$. The obtained value V0 is compared with a determined value Vref in the AGC 704b, which reduces the intensity of light emission by decreasing the duty ratio or amplitude of light emission of the light-emitting diode in case of V0>Vref, or elevates the intensity of light emission in case of V0<Vref. In this manner the AGC 709c controls the diode 709a to achieve a relation V0≈Vref. Thus the light-emitting unit can avoid useless consumption of energy, and the output range of the buffer amplifiers 7011, 7012 (or 7021, 7022) in the input stage can be maintained within a determined range. In addition, the signals Vx, Vy can be easily processed as they always appear in the normalized state where V0 is constant. A position operating circuit 708 determines the distance to the object through a process similar to that of the displacement detecting circuit 404 shown in FIG. 4. If an accurate normalization is achieved through proper function of the AGC 709b, the position operating circuit 708 may perform calculation according to the equation (1), utilizing Vx instead of $\bar{V}x$.

Figure 8:
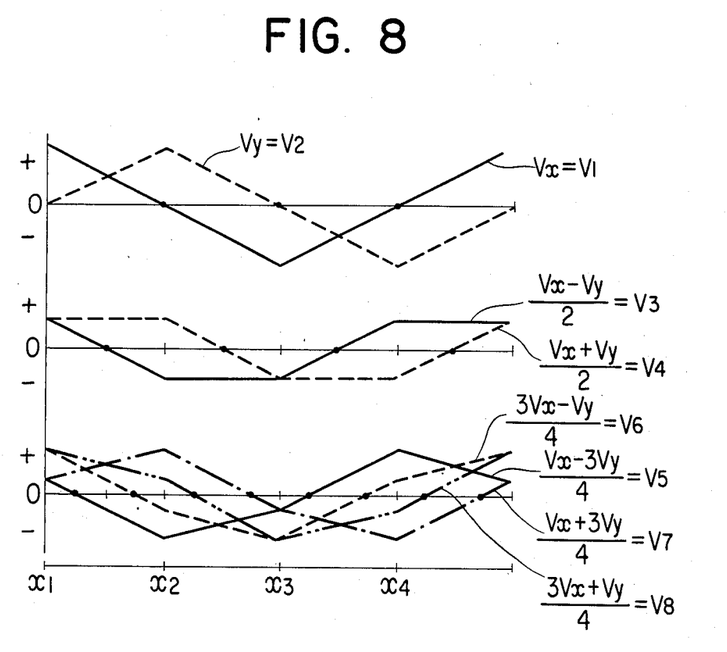
FIG. 8 is a chart showing the function of a fourth embodiment of the present invention.
Figure 9:
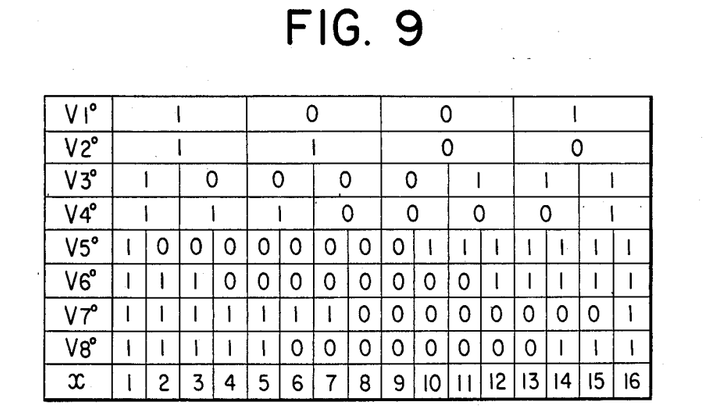
FIG. 9 is a chart showing the signal processing in said fourth embodiment.

FIGS. 8 and 9 show a fourth embodiment, in which the positional displacement is determined in another manner in the position operating circuit 708, which calculates following V1–V8:

$$V_1 = Vx$$

$$V_2 = Vy$$

$$V_3 = (Vx - Vy)/2$$

$$V_4 = (Vx + Vy)/2$$

$$V_5 = (Vx - 3Vy)/4$$

$$V_6 = (3Vx - Vy)/4$$

$$V_7 = (Vx + 3Vy)/4$$

$$V_8 = (3Vx + Vy)/4$$

FIG. 8 shows the changes in the outputs V1–V8 in response to the displacement of the center of gravity of the light intensity in the light spot from x1 to x4. Also FIG. 9 shows the results in FIG. 8 in a form of bit patterns wherein "1" and "0" respectively correspond to $Vi \geq 0$ and $Vi < 0$ 1 (i=1–8). The position operating circuit 708, after calculating the above-mentioned values V1–V8, generates corresponding bit patterns V1°–V8° through comparators. In FIG. 9, "x" indicates the position in the direction of the element array shown in FIG. 2. In this manner the position of the light spot can be easily determined from the bit patterns. It is to be noted that V1°–V8° respectively correspond to V1–V8.

The precision of detection will be equal to 4 divisions of entire four light-receiving elements in case V1° and V2° alone are employed; 8 divisions in case V1°–V4° are employed; and 16 divisions in case V1°–V8° are all employed. It is to be noted, however, that the changes of V1–V8 shown in FIG. 8 correspond to a square intensity distribution of the light spot having a width equal to that of the light-receiving element.

Figure 10A:
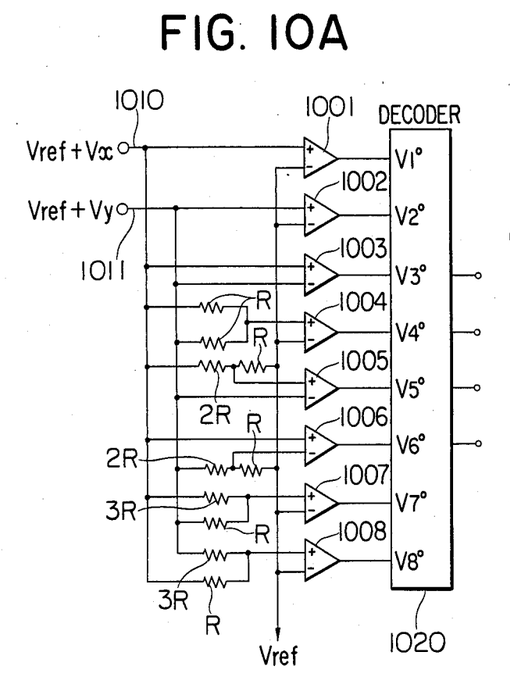
FIG. 10A is a circuit diagram of the fourth embodiment.
Figure 10B:
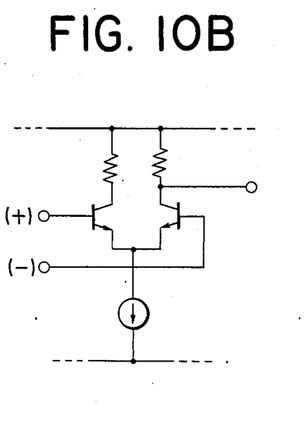
FIG. 10B is a circuit diagram showing a comparator employed in the fourth embodiment.

FIGS. 10A and 10B show a detailed circuit structure of the position operating circuit 708 of the fourth embodiment. Each of comparators 1001–1008 shown in FIG. 10A has a structure for example shown in FIG. 10B. The synchronous rectified output signals Vx, Vy generated, in relation to the aforementioned reference level Vref, at the terminals 705, 706 in FIG. 7C are supplied as voltages Vx+Vref, Vy+Vref respectively to input terminals 1010, 1011 shown in FIG. 10A. In the foregoing explanation of the third and fourth embodiments, the position operating circuit 708 was said to receive Vx and Vy; said operating circuit 708 in fact receives voltages Vx+Vref and Vy+Vref. The comparator 1001 identifies the sign of Vx or V1, and accordingly releases a high-level (1) or low-level (0) output signal V1°. The comparator 1002 identifies the sign of Vy or V2, and accordingly produces the output signal V2°. The comparator 1003 compares Vx with Vy and produces a high-level output V3° when Vx>Vy or V3>0. The comparator 1004 produces a high-level (1) output V4° when the average potential (Vx+Vy)/2 of Vx and Vy is positive. The comparator 1005 compares Vx/3 with Vy and produces a high-level output V5° when Vx/3 >Vy or V5°>0.

The comparator 1006 compares Vx with Vy/3 and produces a high-level (1) output V6° when Vx>Vy/3 or V6>0.

The comparator 1007 produces a high-level (1) output V7° when (Vx+3Vy)/4 is positive or V7>0.

The comparator 1008 produces a high-level (1) output V8° when (3Vx+Vy)/4>0 or V8>0.

The binary signals V1°–V8° thus obtained are decoded by a decoder 1020 as shown in FIG. 9 for calculating the distance, and a 4-bit signal indicating the position of the light spot is produced. "x" indicates the position in the direction of the array of light-receiving elements a1–a4, represented in the unit of ¼ of the width of each light-receiving element.

Figure 11:
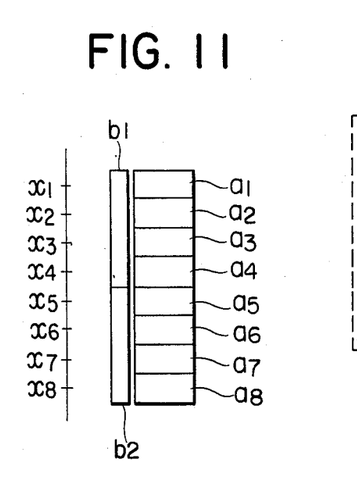
FIG. 11 is a schematic view showing the arrangement of light-receiving elements in a fifth embodiment.
Figure 12:
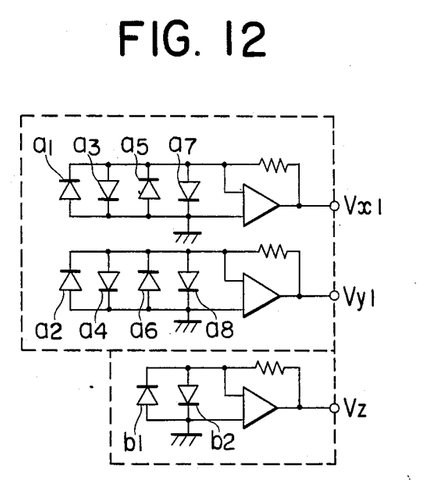
FIG. 12 is a block diagram of a part of the fifth embodiment.

In the foregoing embodiments, the outputs Vx, Vy behave as shown in FIG. 5 or 8 only when the center of gravity of the light spot is located within a range d shown in FIG. 2, corresponding to the width of three light-receiving elements from x1 to x4, but such behavior cannot be expected outside said range. Then FIGS. 11 and 12 show a fifth embodiment capable of detecting the position of the light spot over a wider range. FIG. 11 shows the arrangement of light-receiving elements wherein eight photodiodes a1–a8 are arranged in parallel manner and two additional photodiodes b1, b2 are positioned at the side.

In the present embodiment Vx1, Vy1 and Vz are calculated in the following manner:

$$Vx1 = \{W(a1) - W(a3) + W(a5) - W(a7)\} \times C$$

$$Vy1 = \{W(a2) - W(a4) + W(a6) - W(a8)\} \times C$$

$$Vz = \{W(b1) - W(b2)\} \times C$$

wherein W(a1)–W(a8), W(b1), W(b2) are the quantities of light respectively received by the photodiodes a1–a8, b1, b2, and C is a constant.

Figure 13:
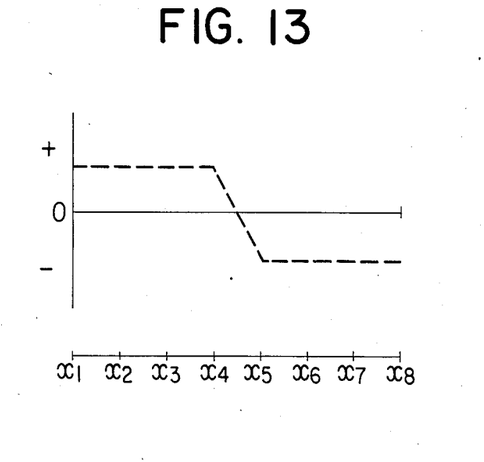
FIG. 13 is a chart showing the function of the fifth embodiment.
Figure 14:
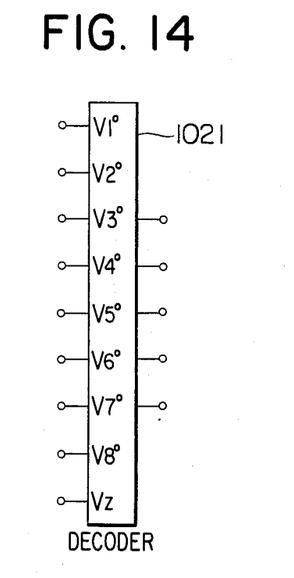
FIG. 14 is a circuit diagram showing a decoder in the fifth embodiment.

FIG. 12 shows a simplest circuit structure of the photoelectric converting unit for obtaining such Vx1, Vy1 and Vz. The position of the light spot can be determined from Vx1 and Vy1 in the same manner as the method shown in FIGS. 3, 4 and 7C utilizing Vx and Vy. The present embodiment allows to obtaining the characteristic shown in FIG. 5 or 8 over a width of seven light-receiving elements, but said characteristic contains approximately two cycles of change. The output Vz, changing the sign as shown in FIG. 13, Z5 can be utilized for identifying to which cycle the signal belongs. FIG. 14 shows a decoder 1021 capable of decoding Vz, in addition to the functions of the decoder 1020. Said decoder 1021 generates a 5-bit signal indicating the position of the light spot within a range from x1 to x8 shown in FIG. 11, with a resolving power equal to ¼ of the width of each light-receiving element. The points of a same phase in said two cycles correspond to significantly different distances. Consequently, in case the circuit shown in FIG. 7C is employed, it is also possible to identify the distance from the intensity of light emission, since the AGC 709b regulates the amount of light emission from the light-emitting diode 709a according to the distance to the object.

Figure 15:
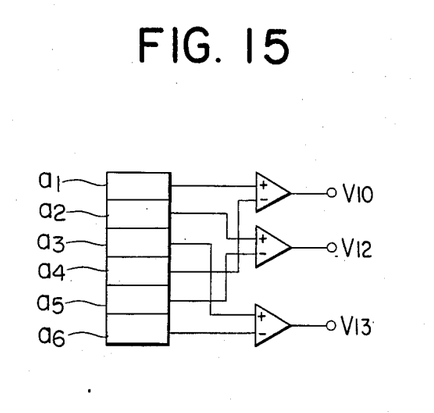
FIG. 15 is a circuit diagram showing a part of a sixth embodiment.

FIG. 15 shows a sixth embodiment wherein the difference of outputs is obtained between a pair of light-receiving elements which are separated by two other light-receiving elements. Differential outputs V10, V11, V12 are thus obtained from such three consecutive pairs, and the position of the light spot is determined from the changes in said outputs. It is also possible to utilize the differential output of a pair of light-receiving elements separated by other three or more light-receiving elements.

What is claimed is:

1. A range finding apparatus for use in a camera by projecting light onto an object and measuring the light reflected therefrom to determine the distance to said object, comprising:

(a) photoarray means having a light-receiving face and plural light-receiving elements one-dimensionally arranged along said light-receiving face, wherein each of said plural light-receiving elements is adapted to generated an output corresponding to the intensity of light incident thereon;

(b) means for guiding said reflected light to said light-receiving face;

(c) means for defining plural pairs in said plural light-receiving elements, wherein two light-receiving elements constituting each pair are separated at least by another of said light-receiving elements, and generating a difference signal indicating the difference of the outputs of two light-receiving elements in each pair; and (d) means for detecting the position of said reflected light on said light-receiving face of said photoarray means in response to said difference signals.

2. An apparatus according to claim 1, further comprising means for controlling said difference signals in such a manner that the level of said difference signals is located within a determined range.

3. An apparatus according to claim 2, wherein said detecting means comprises means for forming, in response to said difference signals controlled by said control means, plural signals of which levels change within said determined range according to the position of said reflected light along said one-dimensional direction on said light-receiving face.

4. An apparatus according to claim 1, wherein said detecting means comprises means for forming, in response to said difference signals, plural signals of which levels change according to the position of said reflected light along said one-dimensional direction on said light-receiving face.

5. An apparatus according to claim 4, wherein said detecting means comprises means for comparing the levels of the plural signals generated by said forming means, with a determined level.

6. An apparatus according to claim 1, wherein said detecting means comprises means for comparing the levels of said difference signals with a determined level.

7. An apparatus according to claim 1, wherein each of said light-receiving elements is a photodiode having an anode and a cathode.

8. An apparatus according to claim 7, wherein said difference signal generating means comprises means for connecting two light-receiving elements constituting said pair in series in such a manner that the anode of one of two light-receiving elements constituting a pair is connected to the anode of the other of said two light-receiving elements.

9. An apparatus according to claim 7, wherein said difference signal generating means comprises means for connecting two light-receiving elements constituting said pair in parallel in such a manner that the anode of one of two light-receiving elements constituting a pair is connected to the cathode of the other of said two light-receiving elements.

10. An apparatus for measuring the distance to an object by the light from said object, comprising:

(a) first photoarray means having plural light-receiving elements arranged along a determined direction, wherein each of said first light-receiving elements is provided with a light-receiving face of a determined width and is adapted to generate an output corresponding to the light intensity at the light-receiving face thereof;

(b) second photoarray means having plural second light-receiving elements arranged along said determined direction so as to be positioned alongside said first light-receiving elements, wherein each of said second light-receiving elements is provided with a light-receiving face of a width corresponding to a determined number of said first light-receiving elements along said determined direction and is adapted to generate an output corresponding to the light intensity at the light-receiving face thereof;

(c) means for defining plural pairs in said first light-receiving elements, wherein two light-receiving elements constituting each pair are separated at least by another first light-receiving element, and generating a first difference signal representing the difference between the outputs of two light-receiving elements in each pair;

(d) means for generating a second difference signal representing the difference between the outputs of two different second light-receiving elements of said second photoarray means; and (e) means for measuring the distance to the object according to said first and second difference signals.

11. An apparatus comprising:

(a) photoarray means having a light-receiving face and plural light-receiving elements one-dimensionally arranged along said light-receiving face, wherein each of said plural light-receiving elements is adapted to generate an output corresponding to the intensity of light incident thereon;

(b) means for guiding a light spot to said light-receiving face;

(c) means for defining plural pairs in said plural light-receiving elements, wherein two light-receiving elements constituting each pair are separated by at least another of said light-receiving elements, and generating a difference signal indicating the difference of the outputs of two light-receiving elements in each pair; and (d) means for detecting the position of said light spot on said light-receiving face of said photoarray means in response to said difference signals.

12. A range finding apparatus for use in a camera by projecting light onto an object and measuring the light reflected therefrom to determine the distance to said object, comprising:

(a) photoarray means having a light-receiving face and plural light-receiving elements one-dimensionally arranged along said light-receiving face, wherein each of said plural light-receiving elements is adapted to generate an output corresponding to the intensity of light incident thereon;

(b) means for guiding said reflected light to said light-receiving face;

(c) meahs for defining plural pairs in said plural light-receiving elements, wherein two light-receiving elements constituting each pair are separated by at least another of said light-receiving elements, and producing plural difference signals each of which indicates the difference of the outputs of two light-receiving elements in each pair; and (d) detecing means for detecting the position of said reflected light on said light-receiving face of said photoarray means in response to said plural difference signals, said detecting means including producing means responsive to said plural difference signals to produce plural binary signals the number of which is greater than the number of said plural difference signals, the levels of said plural binary signals varying according to the position of said reflected light along said one-dimensional direction on said light receiving surface.

13. A range finding apparatus according to claim 12, wherein said producing means includes operation means for calculating said plural binary signals in accordance with said plural difference signals.

14. A range finding apparatus for use in a camera by projecting light onto an object and measuring the light reflected therefrom to determine the distance to said object, comprising:
   (a) photoarray means having a light-receiving face and plural light-receiving elements one-dimensionally arranged along said light-receiving face, wherein each of said plural light-receiving elements is adapted to generate an output corresponding to the intensity of light incident thereon;
   (b) means for guiding said reflected light to said light-receiving face;
   (c) means for defining plural pairs in said plural light-receiving elements, wherein two light-receiving elements constituting each pair are separated by at least another of said light-receiving elements, and generating a difference signal indicating the difference of the outputs of two light-receiving elements in each pair; and
   (d) means for detecting the position of said reflected light on said light-receiving face of said photoarray means in response to said difference signals, said detecting means being adapted to produce, on the basis of said difference signals, linear signals which vary substantially linearly with the displacement of said reflected light on said light-receiving face along said one-dimensional direction.

15. An apparatus according to claim 14, wherein said detecting means comprises means for normalizing said difference signals and generating normalized signals.

16. An apparatus according to claim 15, wherein said detecting means comprises means for generating said linear signals in response to said normalized signals.

17. A range finding apparatus for use in a camera by projecting light onto an object and measuring the light reflected therefrom to determinc the distance to said object, comprising:
   (a) photoarray means having a light-receiving face and plural light-receiving elements one-dimensionally arranged along said light-receiving face, wherein each of said plural light-receiving elements is adapted to generate an output corresponding to the intensity of light incident thereon;
   (b) means for guiding said reflected light to said light-receiving face;
   (c) means for defining plural pairs in said plural light-receiving elements, wherein two light-receiving elements constituting each pair are separated by at least another of said light-receving elements, and generating a difference signal indicating the difference of the outputs of two light-receiving elements in each pair; and
   (d) means for detecting the positon of said reflected light on said light-receiving face of said photoarray means in response to said difference signals, said detecting means including signal forming means for producing on the basis of said difference signals, output signnals of which phase varies according to the position of said reflected light on said light-receiving face.

18. An apparatus according to claim 17, wherein said detecting means comprises means for generating a reference signal for phase comparison with the output signals of said signal forming means.

* * * * *